United States Patent

Church et al.

[11] Patent Number: 5,876,264
[45] Date of Patent: Mar. 2, 1999

[54] DEPOSITION PROCESS WINDAGE CALIBRATION

[75] Inventors: Mark A. Church, Los Gatos; Alain Michael DeSouches, Santa Cruz, both of Calif.

[73] Assignee: International Business Machines Corporation, Armonk, N.Y.

[21] Appl. No.: 845,339

[22] Filed: Apr. 25, 1997

[51] Int. Cl.$^6$ .................................................. B24B 49/10
[52] U.S. Cl. .................................................. 451/5; 451/10
[58] Field of Search .............................. 451/1, 5, 10, 11; 29/603.15, 603.16

[56] References Cited

U.S. PATENT DOCUMENTS

| | | |
|---|---|---|
| 4,559,743 | 12/1985 | Kracke et al. . |
| 4,675,986 | 6/1987 | Yen . |
| 4,689,877 | 9/1987 | Church . |
| 4,839,197 | 6/1989 | Henderson . |
| 4,841,625 | 6/1989 | Valstyn . |
| 4,912,883 | 4/1990 | Chang et al. . |
| 4,914,868 | 4/1990 | Church et al. . |
| 4,991,046 | 2/1991 | Adamson et al. . |
| 5,175,938 | 1/1993 | Smith . |
| 5,210,667 | 5/1993 | Zammit . |
| 5,361,547 | 11/1994 | Church et al. . |
| 5,494,473 | 2/1996 | Dupuis et al. . |

FOREIGN PATENT DOCUMENTS 5-101339  4/1993  Japan .

OTHER PUBLICATIONS

IBM Technical Disclosure Bulletin, "Using Magneto–Resistive Head Transducers as Lapping Transducers and a Parallel Resistor System to Calculate Lapping Constants", vol. 36, No. 09A, Sep. 1993, pp. 79–81.

IBM Technical Disclosure Bulletin, "Element Height Determination for Thin–Film Transducers", vol. 18, No. 11, 4–1976, pp. 3782–3783.

Primary Examiner—Robert A. Rose
Attorney, Agent, or Firm—John H. Holcombe

[57] ABSTRACT

Disclosed is an apparatus and method for calibrating the deposition windage of deposited thin film resistive elements, such as magnetoresistive read elements for magnetic heads which are to be lapped, comprising one set of at least three resistive elements having different nominal height dimensions, a resistance detector for measuring the resistance of each of the resistive elements, and a windage calculator responsive to the nominal height dimensions and to the measured resistances of each of the resistive elements for calculating the windage of the one set of resistive elements.

11 Claims, 2 Drawing Sheets

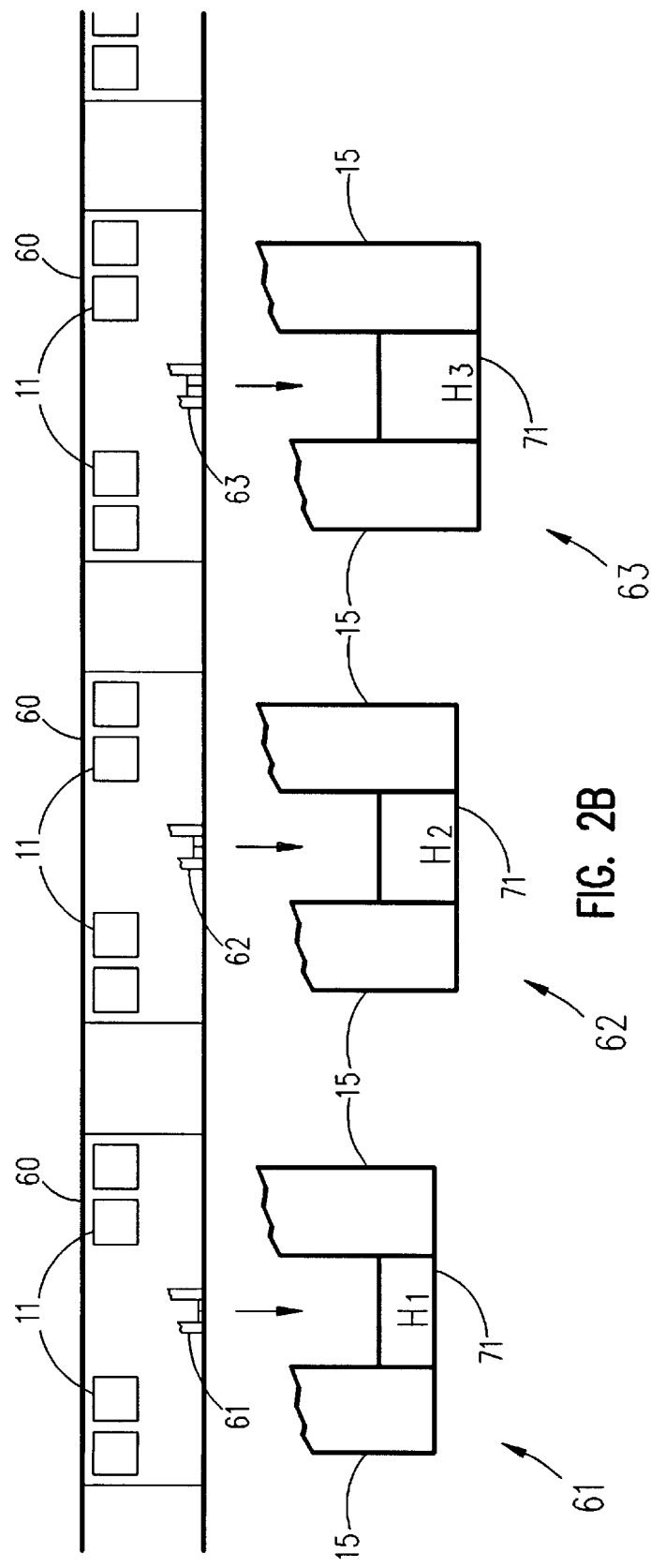

DEPOSITION PROCESS WINDAGE CALIBRATION

FIELD OF INVENTION

This invention relates to the calibration of windage in deposition processes, and, more particularly, to the calibration of windage in the deposition of resistive elements.

BACKGROUND OF THE INVENTION

Many direct access storage device manufacturers employ thin film magnetic recording heads. In manufacturing such heads, rows of magnetic recording transducers are deposited simultaneously on wafer substrates using semiconductor type process methods. Thin film magnetic heads are generally mutli-layered heads that require sequential depositions and pattern constructions of alternating layers of magnetic films, insulators, and conductors on top of a substrate (or ceramic wafer). Photolithography is the process commonly used to transfer a pattern from a mask to the surface of the substrate wafer. The patterns are first transferred from the mask to a light-sensitive material called photoresist. Next, chemical or plasma etching is used to transfer the pattern from the photoresist to a barrier material on the surface of the wafer. The photolithographic process is repeated to form the various layers of the thin film heads.

After the rows of magnetic recording transducers have been deposited onto the wafer, the wafers are partitioned or sliced into rows of sliders called slider rows, or alternatively, partitioned or sliced into modules having multiple rows of sliders. When separated from the slider rows, each slider contains a magnetic read/write component, referred to as the head, and an air-bearing surface configured to aerodynamically "fly" over the surface of a spinning magnetic disk medium. Conventional thin film read/write heads in data storage systems generally include an inductive write head in combination with either an inductive or magnetoresistive (MR) read head. One type of MR/inductive head includes an inductive write head formed adjacent to a MR read head.

While fabricating sliders, the slider rows or modules may be bonded to tool blocks called transfer tools, which are used to hold the slider row or module while performing lapping or grinding operations to form the air bearing surface. Typically, the slider rows distort from a co-linear line as a result of the internal stress of the wafer material and the surface stresses developed when reducing the wafers to slider rows or modules. Furthermore, the bonding operation may cause additional distortion. The combined stress distortion and bonding distortion of slider rows or modules may result in a total distortion or curvature condition called "row bow".

Row bow may cause a row of sliders to be non-uniformly lapped during the lapping process. As such, this row bow condition can detrimentally affect critical head performance parameters, such as stripe height in MR heads, and throat height in inductive heads. To achieve optimum performance of MR/inductive heads, both the stripe height and throat height must be tightly controlled. Unfortunately, the performance of the MR/inductive heads may be degraded by row bow.

The lapping control system described in commonly assigned U.S. Pat. No. 4,914,868 may be used to measure the electrical resistance of the MR elements in an MR head while lapping a slider row. The measured resistances are used for controlling the degree of lapping for each of the MR elements in a slider row to compensate for row bow. The electrical resistance is related to the desired MR element height (also referred to as stripe height); and, when the desired MR element height is reached, the lapping process is terminated. More specifically, the stripe height of the MR element s is calculated from the equation:

$$s = K/(R-RL) \quad (1)$$

where:

K=(resistivity p*track width 1)/(film thickness f)
R=resistance of the MR element
RL=lead resistance In order to control the amount of lapping performed on a slider row and to accurately determine the final MR element height (at the conclusion of lapping), both K and RL must be known.

The lapping process may begin with two well-defined initial MR element heights, s1 and s2, interleaved throughout the row. In other words, the MR elements in a slider row are deposited on the wafer with alternating MR stripe heights s1 and s2. The MR element heights, s1 and s2, deposited on the wafer may be optically measured. Once the MR element heights s1 and s2 are known, the following equations may be used to calculate K and RL:

$$s1 = K/(R1-RL) \quad (2)$$

$$s2 = K/(R2-RL) \quad (3)$$

By providing MR elements with two known heights, the final resistance of the MR elements can be used to determine the final MR element height. Thus, the lapping process may be controlled by the resistance of the MR elements in a slider row.

It is important to note that if the MR element heights s1 and s2 are not known, then equations (2) and (3) alone, may not be used to calculate K and RL. Unfortunately, measuring the MR element heights s1 and s2 typically requires an additional processing step prior to the lapping operation.

An alternative lapping method that uses the resistance of the MR elements to control the lapping provides one or more test sites on a wafer for measuring the windage of the wafer. Windage atypically refers to the deviation in the dimensions of elements e.g., MR elements) deposited on a wafer from the dimensions of the mask (also referred to as the nominal value), which may result from the misalignment of masks or process variations.

The windage may be calibrated by actual measurements by a probe that provides substantially zero lead resistance RL. A calibration step is described in IBM Technical Disclosure Bulletin, Vol. 18, No. 11, April 1976, p. 3782. The calibration information must then be stored in a database for subsequent access and use in the lapping process. An alternative method for estimating the windage is mentioned in coassigned U.S. Pat. No. 5,361 541, at col. 9, line 65 to col. 11, line 3, again requiring a separate measurement step before lapping and requiring storage of data while awaiting multiple wafer and row processing steps before being employed in the lapping process. Once the windage is known, the following equation may be used to calculate K, assuming that RL is substantially zero.

$$R = K + RL/(Hn+W) \quad (4)$$

where:

K=(resistivity p*track width 1)/(film thickness f)
R=resistance of the MR element
RL=lead resistance
W=windage
Hn=nominal height of an MR element Once K is known, the MR element height (i.e., stripe height) may be determined from equation (1). Thus, the measured resistance of the MR element may be used to control the amount of lapping of a slider row.

The separate windage calibration step prior to lapping is costly both from the standpoint of the extra time required to conduct the step, and from the standpoint of the computer data storage space and transmission required to save the data for a later calibration step. Additionally, the test sites are positioned on a wafer and occupy space that would otherwise be used for additional sliders and heads. Furthermore, the number of test sites are typically limited and cannot be positioned next to each MR location. The chance for error due to the few test sites and lack of close positioning may degrade the ability to accurately predict the MR stripe height at during lapping. Thus, it is much more desirable to determine windage directly at each element location during the lapping operation without a separate calibration step and without the use of test sites.

SUMMARY OF THE INVENTION

Disclosed is an apparatus and method for calibrating the deposition windage of deposited thin film resistive elements, such as magnetoresistive read elements for magnetic heads which are to be lapped, comprising one set of three resistive elements having different nominal height dimensions, an electrical resistance detector for measuring the resistance of each of the three resistive elements, and a windage calculator responsive to the nominal height dimensions and to the measured resistances of each of the resistive elements for calculating the windage of the one set of resistive elements in accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Nominal height of resistive element 1

$H_2$=Nominal height of resistive element 2

$H_3$=Nominal height of resistive element 3

$R_1$=Resistance of resistive element 1

$R_2$=Resistance of resistive element 2

$R_3$=Resistance of resistive element 3.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIGS. 2A and 2B are diagrams showing the resistive elements in a row according to an embodiment of the present invention.

DETAILED DESCRIPTION

Figure 1:
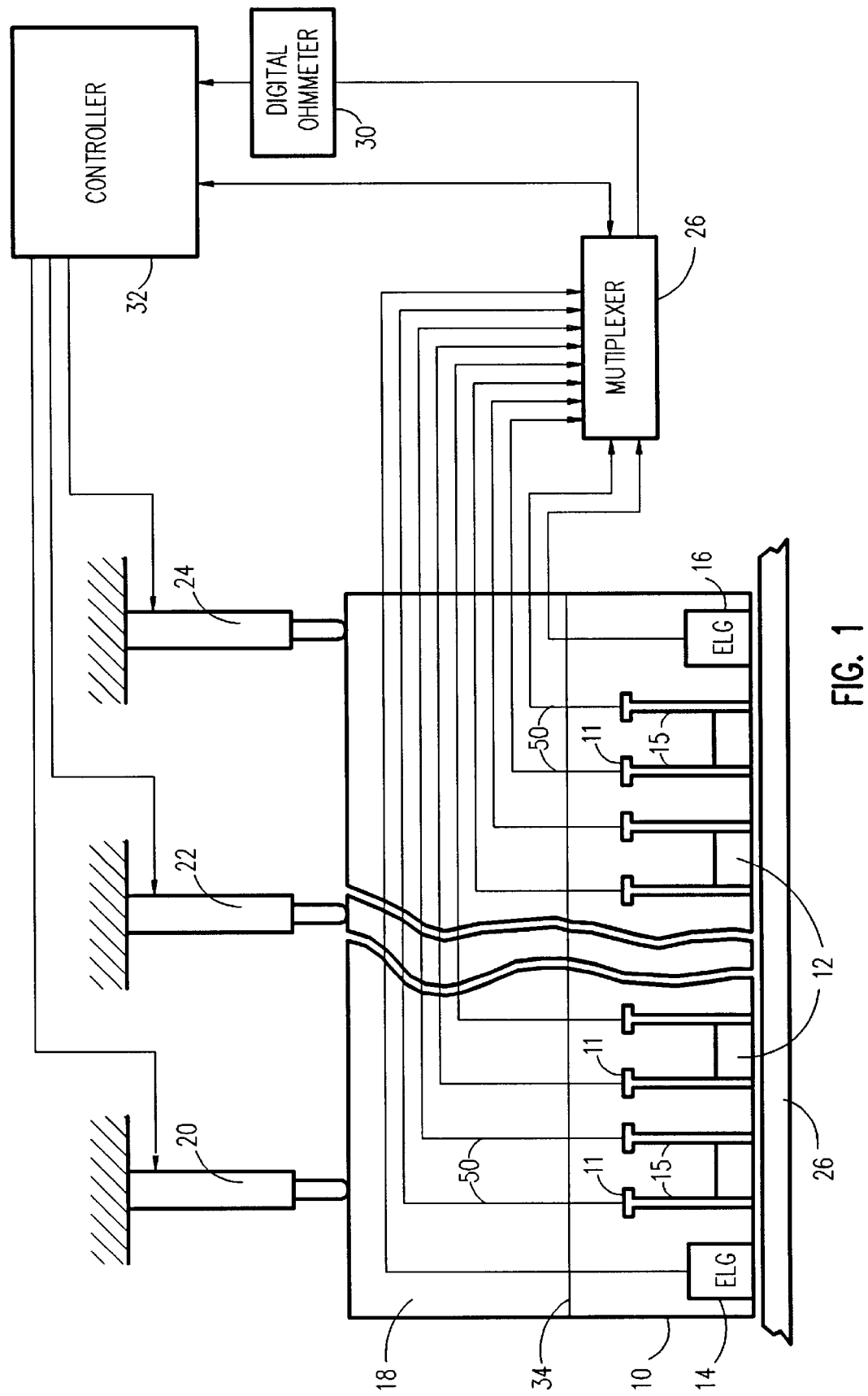
FIG. 1 is a block diagram of a lapping system that can be used to implement the windage calibration of the present invention.

The present invention may be used to measure the windage of a resistive element deposited onto a wafer or substrate of any suitable material. For one embodiment, the windage may be calculated during the fabrication of thin film magnetic heads for magnetic disk or magnetic tape data storage systems.

FIG. 1 illustrates one embodiment of a lapping control system that is used to lap substrate rows. The defined height of each head 12 is attained by lapping each head 12 of a substrate row 10 until the magnetoresistive (MR) element reaches the desired resistance. The substrate row 10 may be referred to as a slider row.

For one embodiment, each of the heads 12 comprises an inductive write transducer and a MR read transducer. During a lapping operation, a substrate row 10 is fastened to a holder 18, which may be a flexible beam, and placed against actuators 20, 22, and 24. The actuators 20, 22, and 24 position the substrate row 10 into a spaced relationship with a lapping plate 26. The actuators 20, 22, and 24 control the amount of pressure placed against the holder 18, which forces the substrate row 10 against the lapping plate 26. The lapping plate 26 is, as is known to those skilled in the art, an abrasive surface which through relative motion effects lapping of the substrate row 10. The substrate row 10 is lapped in order to remove material from the inductive and magnetoresistive transducers of the head at the height defining edges thereof.

For one embodiment, the depth of the lapping provided by the lapping plate 26 is monitored initially through two electrical lapping guides (ELG's) 14 and 16. The ELG's are preferably one or more closed switches which are opened by lapping through a deposited ELG connector. Thus, a rough lapping dimension can be achieved under control of the ELG's. The ELG's are not a necessary requirement for lapping.

Fine lapping may be performed to ensure that the substrate row 10 is uniformly lapped, despite row bow. The fine lapping typically includes measuring and comparing the resistance of each of the MR elements during lapping, and correspondingly controlling the amount of pressure each section of the substrate row 10 receives. By controlling the actuators 22, 24, and 26 the substrate row 10 may be held level with respect to the lapping surface. The amount of pressure and the time the pressure is applied by each of the actuators 20, 22 and 24 determines the amount of material removed. By employing a differential pressure in each of the actuators 20, 22, and 24 and by mounting the substrate row 10 on the holder 18, which may be a flexible beam, the holder 18 is allowed to deflect as material is removed. Thus, either a convex or a concave bow condition can be corrected.

Each of the MR elements 12 is provided with leads 15 terminating at contacts 11. A cable provided with a plurality of conductors 50 connects each of the leads 15 of the MR elements 12 to a multiplexer 28.

The resistance measurements provided by the MR elements 12 are determined from an electrical resistance detector, e.g., the multiplexer 28 and the digital ohmmeter 30. Under control of controller 32, each of the resistance measurements provided by the MR elements can be addressed through the multiplexer 28 and the meter 30. The results of the measurements are stored in the controller 32 for comparison to the other such measurements and are utilized to indicate the height of the MR elements 12 during the lapping process. The controller 32 can, by constantly measuring the resistance of the MR elements 12, maintain the substrate row 10 level with respect to the lapping plate so that all MR elements 12 are lapped to substantially the same height. Additionally, when the desired MR element height is detected through the lapping process, the controller 32 may command the actuators 20, 22 and 24 to withdraw the substrate row 10 from the lapping surface to terminate the lapping process.

Specifically, the resistance of each of the MR elements 12 is sensed by the controller 32, and the controller 32 reacts to any difference in resistance, for instance, between MR elements 12 in different parts of the substrate row 10, by applying added pressure to the part of the substrate row 10 where the MR elements 12 have lower resistance so that additional material can be removed in that part of the substrate row 10 to cause the resistance measured to increase for the MR elements 12 at that part of the substrate row.

For one embodiment 10, a three stripe height resistive element windage determining system may be used to measure the windage at the beginning of lapping without requiring an earlier separate test step and without a special separate test site. In addition, the windage of each resistive element may be determined if all of the elements are in an interlaced three height arrangement. For an alternate embodiment, more than three stripe heights may be used to calculate the windage. For example, if four stripe heights are used, then the resistive elements may be deposited in groups resistive of four, with each resistive element in a group having a different stripe height.

A layout of the interlaced three height arrangement is shown in FIGS. 2A and 2B. FIG. 2A is a diagram of an enlarged top view of a row of sliders 60 from a wafer (i.e., a slider row or a substrate row) showing the MR elements 61, 62 and 63 and the contacts 11. FIG. 2B is a further enlarged diagram of the MR elements 61, 62 and 63 illustrating the specific MR stripes 71, 72 and 73, and leads 15. Each lead 15 is connected to a corresponding contact 11.

The first MR element 61 has an initial stripe height of $H_1$, the second MR element 62 has an initial stripe height of $H_2$, and the third MR element 63 has an initial stripe height of $H_3$. Each of the three stripe heights is different. One set of three MR elements 61, 62, and 63 may be used to determine the windage of a substrate row 60, and of the wafer.

Alternatively, the set of three MR elements may be repeated in the same order starting with the first slider in a substrate row 60 and continuing to the last slider in the substrate row 60.

The resistance of any of the three stripe heights is given as:

$$R = (p/f * 1/s) + RL \quad (5)$$

where:
R=resistance of the resistive (MR) element
p=resistivity of the material comprising the resistive element
f=film thickness
l=length of the resistive element or track width
s=stripe height
RL=lead resistance
or:

$$R = \frac{K + RL}{H_n + W} \quad (6)$$

where:
R=resistance of the resistive (MR) element
K=(resistivity p * track width l)/(film thickness f)
$H_n$=nominal height of resistive elements 1 to 3
W=wafer process windage
RL=lead resistance As discussed above, in order to lap substrate rows, the height of the MR element must be continually known. From the above general equation, the solution for stripe height can be derived if the windage (W), slope constant (K) and lead resistance (RL) are known. The resistances of three MR elements can be used to calculate (W), (K) and (RL) for the middle MR element (e.g., MR element 62) of each set. Furthermore (K) and (RL) for the other two MR elements may be assumed to be the same as the middle MR element.

Typically, MR elements in close proximity have substantially similar structural characteristics that they can be assumed to be the same. Hence, for these calculations, it can be assumed that the resistance of the leads (RL), and the sheet resistance and MR track width making up the slope constant (K) are equal for all MR elements in a set. In addition, regardless of the stripe height windage, the difference between any two adjacent devices is equal to the "design value". If the "design value" for two adjacent devices is identical, there will be no difference. In other words, if the stripe height of the MR element 2 (e.g., MR element 62) increases in height due to photolithography windage (described above), the stripe heights of elements 1 (e.g., MR element 61) and 3 (e.g., MR element 63) will increase the same amount. If all three MR elements in a set increase their stripe heights by the same amount, the difference in design height between them must be the same.

The windage (W) for a set of three MR elements can be calculated by controller 32 serving as a windage calculator from the following equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3 (R_2 - R_1)}$$

where: $H_1$=Nominal height of resistive element 1
$H_2$=Nominal height of resistive element 2
$H_3$=Nominal height of resistive element 3
$R_1$=Resistance of resistive element 1
$R_2$=Resistance of resistive element 2
$R_3$=Resistance of resistive element 3.

Once windage (W) is calculated, the lead resistance (RL) can be calculated for each adjacent pair of MR elements:

If pairing the first MR element 61 and the second MR element 62, $$RL = \frac{R_2 * (H_2 + w) - R_1 * (H_1 + w)}{H_2 - H_1}.$$

If pairing the second MR element 62 and the third MR element 63, $$RL = \frac{R_3 * (H_3 + w) - R_2 * (H_2 + w)}{H_3 - H_2}.$$

Once the windage (W) and lead resistance (RL) are calculated, the slope constant (K) can be calculated as shown below:

If pairing the first MR element 61 and the second MR element 62, $$K = \frac{(H_2 - H_1) * (R_1 - RL) * (R_2 - RL)}{(R_1 - R_2)}.$$

If pairing the second MR element 62 and the third MR element 63, $$K = \frac{(H_3 - H_2) * (R_2 - RL) * (R_3 - RL)}{(R_2 - R_3)}.$$

The lapping constants (L) and (K) may be calculated by pairing twice for any one MR element. The first pairing is with the MR element's left neighbor and the second pairing is with the MR element's right neighbor. The two values of (K) and (RL) obtained are then averaged to calculate the final (K) and (RL) value for that device.

Once (K) and (RL) is established for each MR element, lapping may be performed with the lapping control system shown in FIG. 1.

The present invention is best applied to the stripe height of MR elements of magnetic heads, but is not limited thereto. For the purpose of lapping, the resistive elements or resistors of the present invention may also be used in ELG's. The ELG resistors would be replicated as described above and the calculations of windage (W), slope constant (K) and lead resistance (RL) would be identical. At the completion of lapping by ELG's alone, a quadratic fitting (e.g., fitting of a second order equation) of the line of ELG's would provide a means for interpolating the height of MR devices and extrapolating the end devices.

In the alternative, rather than employ the MR heads to measure the stripe height, the resistance of separate MR elements in the kerfs between sliders or modules may be used to measure the stripe height of the MR head. The separate kerf MR elements would employ the three stripe heights of the invention as described above.

Accordingly, no separate testing step is required and no special test site is required to measure windage.

Stripe height is the determining factor for lapping heads and is therefore the focus of the foregoing description. However, other suitable dimensional factors, such as resistor width, may be similarly utilized within the scope of the present invention and are considered to be inclusive within the definition of "height" in the following claims.

While the preferred embodiments of the present invention have been illustrated in detail, it should be apparent that modifications and adaptations to those embodiments may occur to one skilled in the art without departing from the scope of the present invention as set forth in the following claims.

We claim:

1. An apparatus for calibrating the deposition windage of a deposited thin film resistive material comprising:

a plurality of thin film resistive elements of said thin film resistive material having a height dimension and at least two terminals, one set of at least three of said resistive elements having different nominal height dimensions;

an electrical resistance detector for measuring the resistance of each resistive element of said one set of at least three resistive elements; and a windage calculator responsive to said nominal height dimensions and to said measured resistances of each of said resistive elements of said one set of at least three resistive elements detected by said electrical resistance detector for calculating the windage of said one set of at least three resistive elements.

2. The deposition windage calibration apparatus of claim 1, wherein:

said windage calculator calculates said windage in accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Nominal height of resistive element 1
$H_2$=Nominal height of resistive element 2
$H_3$=Nominal height of resistive element 3
$R_1$=Resistance of resistive element 1
$R_2$=Resistance of resistive element 2
$R_3$=Resistance of resistive element 3.

3. A method for measuring the deposition windage of a deposited thin film resistive material comprising the steps of:

receiving at least one wafer with at least one set of three thin film resistive elements of said thin film resistive material having a height dimension and at least two terminals, said set of three of said resistive elements having different nominal height dimensions;

measuring the resistance of each of said one set of three resistive elements; and calculating, from said nominal height dimensions and said measured resistances of each of said resistive elements of said set of three resistive elements, the windage of said resistive elements in accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Nominal height of resistive element 1
$H_2$=Nominal height of resistive element 2
$H_3$=Nominal height of resistive element 3
$R_1$=Resistance of resistive element 1
$R_2$=Resistance of resistive element 2
$R_3$=Resistance of resistive element 3.

4. A lapping control system for accurately obtaining a desired element height of a plurality of batch fabricated thin film magnetic transducers formed in a row on a substrate comprising:

at least one set of three of said thin film magnetic transducers formed in said row comprising a set of magnetoresistive elements, each of said thin film magnetic transducers comprising one of said magnetoresistive elements, each of said magnetoresistive elements having a height defining edge and at least two terminals, each of said magnetoresistive elements of said set of magnetoresistive elements having different initial heights of said height defining edge;

an electrical resistance detector for measuring the resistance of each said magnetoresistive element of said set of magnetoresistive elements during lapping of said height defining edge;

a windage calculator responsive to said measured resistances of each said magnetoresistive element of said set of magnetoresistive elements initially detected by said electrical resistance detector before said lapping reduces any of said height defining edges, for calculating the windage of said set of magnetoresistive elements; and a lapping control responsive to said calculated windage and to said measured resistances for calibrating resistance versus height characteristics for at least one of said magnetoresistive elements and for terminating said lapping process when a predetermined element height is reached for said magnetoresistive elements.

5. The lapping control system of claim 4, wherein:

said windage calculator is additionally responsive to a predetermined initial nominal height of each of said set of magnetoresistive elements for calculating said windage.

6. The lapping control system of claim 5, wherein:

said windage calculator calculates said windage in accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Initial nominal height of magnetoresistive element 1
$H_2$=Initial nominal height of magnetoresistive element 2
$H_3$=Initial nominal height of magnetoresistive element 3
$R_1$=Initial resistance of magnetoresistive element 1
$R_2$=Initial resistance of magnetoresistive element 2
$R_3$=Initial resistance of magnetoresistive element 3.

7. A method for lapping a plurality of batch fabricated thin film magnetic transducers formed in a row on a substrate, each said transducer comprising a magnetoresistive element having a height defining edge and at least two terminals, comprising the steps of:

providing a set of at least three of said magnetoresistive elements having different initial heights of said height defining edge;

measuring the resistance of each of said magnetoresistive elements of said set during lapping of said height defining edge;

calculating, in response to said measured resistances of each of said magnetoresistive elements of said set measured in said measuring step before said lapping reduces any of said height defining edges, the windage of said set;

calibrating, in response to said calculated windage and to said measured resistances, resistance versus height characteristics for each of said magnetoresistive elements; and terminating said lapping process when a predetermined element height is reached for each of said magnetoresistive elements.

8. The lapping method of claim 7, wherein:
said windage calculation step is additionally responsive to a predetermined initial nominal height of each of said magnetoresistive elements of said one set for calculating said windage.

9. The lapping method of claim 8, wherein:
said windage calculation step comprises calculating windage in accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Initial nominal height of magnetoresistive element 1
$H_3$=Initial nominal height of magnetoresistive element 3
$R_1$=Initial resistance of magnetoresistive element 1
$R_2$=Initial resistance of magnetoresistive element 2
$R_3$=Initial resistance of magnetoresistive element 3.

10. An apparatus for calibrating the deposition windage of a plurality of thin film resistive elements of thin film resistive material having a height dimension and at least two terminals, one set of at least three of said resistive elements having different nominal height dimensions, comprising:

an electrical resistance detector for measuring the resistance of each said one set of three resistive elements; and a windage calculator responsive to said nominal height dimensions and to said measured resistances of each of said resistive elements of said one set detected by said electrical resistance detector for calculating the windage of said one set of resistive elements accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Nominal height of resistive element 1
$H_2$=Nominal height of resistive element 2
$H_3$=Nominal height of resistive element 3
$R_1$=Resistance of resistive element 1
$R_2$=Resistance of resistive element 2
$R_3$=Resistance of resistive element 3.

11. A method for lapping a plurality of batch fabricated thin film magnetic transducers formed in a row on a substrate, each transducer comprising a magnetoresistive element having a height defining edge and at least two terminals, one set of at least three of said magnetoresistive elements having different initial nominal heights of said height defining edge, said method accurately obtaining a desired element height of each of said magnetoresistive elements, comprising the steps of:

measuring the resistance of each of said magnetoresistive elements during lapping of said height defining edge;

calculating, in response to said measured resistances of each of said magnetoresistive elements of said one set measured in said measuring stop before said lapping reduces any of said height defining edges, the windage of said one set of magnetoresistive elements in accordance with the equation:

$$W = \frac{H_1 * H_3 * (R_1 - R_3) + H_3 * H_2 * (R_3 - R_2) + H_2 * H_1 * (R_2 - R_1)}{H_1 * (R_3 - R_2) + H_2 * (R_1 - R_3) + H_3(R_2 - R_1)}$$

where: $H_1$=Initial nominal height of magnetoresistive element 1
$H_2$=Initial nominal height of magnetoresistive element 2
$H_3$=Initial nominal height of magnetoresistive element 3
$R_1$=Initial resistance of magnetoresistive element 1
$R_2$=Initial resistance of magnetoresistive element 2
$R_3$=Initial resistance of magnetoresistive element 3;

calibrating, in response to said calculated windage and to said measured resistances, resistance versus height characteristics for each of said magnetoresistive elements; and terminating said lapping process when a predetermined element height is reached for said magnetoresistive elements.

* * * * *